United States Patent
Helsing et al.

(10) Patent No.: US 10,611,048 B1
(45) Date of Patent: Apr. 7, 2020

(54) WOOD TREATMENT DEVICE

(71) Applicant: SmartFume Co., Albany, OR (US)

(72) Inventors: Guy Helsing, Albany, OR (US); Michael Peterschmidt, Albany, OR (US)

(73) Assignee: SmartFume Co., Albany, OR (US)

( * ) Notice: Subject to any disclaimer, the term of this patent is extended or adjusted under 35 U.S.C. 154(b) by 0 days.

(21) Appl. No.: 15/608,796

(22) Filed: May 30, 2017

Related U.S. Application Data (60) Provisional application No. 62/342,331, filed on May 27, 2016.

(51) Int. Cl.
| | |
|---|---|
| B27K 3/10 | (2006.01) |
| B27K 3/02 | (2006.01) |
| B27K 3/52 | (2006.01) |
| A01G 7/06 | (2006.01) |
| B27K 3/34 | (2006.01) |

(52) U.S. Cl.
CPC ............ B27K 3/105 (2013.01); B27K 3/0235 (2013.01); A01G 7/06 (2013.01); B27K 3/0257 (2013.01); B27K 3/34 (2013.01); B27K 3/52 (2013.01)

(58) Field of Classification Search
None
See application file for complete search history.

(56) References Cited

U.S. PATENT DOCUMENTS

| | | |
|---|---|---|
| 231,784 A | 8/1880 | Flad |
| 1,312,634 A | 8/1919 | Kruse |
| 1,999,458 A | 4/1935 | Hollister |
| 2,923,039 A | 2/1960 | Imus |
| 2,970,404 A | 2/1961 | Beaufils et al. |

(Continued)

FOREIGN PATENT DOCUMENTS

CA 2027427 A1 4/1992

OTHER PUBLICATIONS

Mothershead, J.S., et al. Research on Inspection and Treatment of Western Red Cedar and Douglas Fir Poles in Service, Forest Products Research for Forest Research Laboratory—Oregon State University, Final Report to Cooperators Project 26E-13, Jul. 1965, 54 pages.

(Continued)

*Primary Examiner* — Binu Thomas
(74) *Attorney, Agent, or Firm* — Kolisch Hartwell, P.C.

(57) ABSTRACT

A wood-treatment device may provide controlled release of a wood treatment agent, such as a fumigant, when placed into standard bored treatment holes in wood structural members. Fumigant release may be controlled by releasing the fumigant through a controlled-release component that may be in a neck of the container or in a passageway of a cap assembly. The cap assembly may include an extension that dislodges the controlled-release component when placed on an open end of the container or has a needle that punctures a seal covering a container opening. The container may have ends configured to be engaged by an adapter used to manipulate the container in a bored hole. The adapter may clip onto a neck of the container, have flanges to seal a bored hole when inserted therein, and have a distal end with an opening configured for engagement and manipulation by an external tool.

3 Claims, 9 Drawing Sheets

(56) References Cited

U.S. PATENT DOCUMENTS

| | | | |
|---|---|---|---|
| 3,010,140 A * | 11/1961 | Thomas | A47L 23/05 401/262 |
| 3,077,166 A | 2/1963 | Delp | |
| 3,290,822 A | 12/1966 | Mauget | |
| 3,295,254 A | 1/1967 | Schoonman | |
| 3,367,065 A | 2/1968 | Cravens | |
| 3,521,745 A * | 7/1970 | Schwartzman | B65D 81/3211 215/6 |
| 3,691,683 A | 9/1972 | Sterzik | |
| 3,706,161 A | 12/1972 | Jenson | |
| 3,745,057 A | 7/1973 | Loft et al. | |
| 3,864,874 A * | 2/1975 | Norris | A01G 7/06 47/57.5 |
| 3,916,564 A * | 11/1975 | Crowell, Sr. | A01C 21/00 111/7.1 |
| 4,084,588 A * | 4/1978 | Koenig | A61M 5/34 604/205 |
| 4,103,456 A | 8/1978 | Hendrixson et al. | |
| 4,207,705 A | 6/1980 | Errede et al. | |
| 4,261,474 A * | 4/1981 | Cohen | A61J 1/2089 215/247 |
| 4,308,689 A | 1/1982 | Jenson et al. | |
| 4,344,250 A | 8/1982 | Fahlstrom | |
| 4,389,446 A | 6/1983 | Blom et al. | |
| 4,445,641 A | 5/1984 | Baker et al. | |
| 4,552,752 A | 11/1985 | Amick | |
| 4,554,155 A | 11/1985 | Allan et al. | |
| 4,648,532 A * | 3/1987 | Green | A61C 5/66 206/222 |
| 4,719,133 A | 1/1988 | Woudsma | |
| 4,724,793 A | 2/1988 | Sletten | |
| 4,866,880 A | 9/1989 | Weinblatt | |
| 4,896,454 A | 1/1990 | Cronenwett et al. | |
| 4,989,366 A | 2/1991 | DeVlieger | |
| 4,995,190 A | 2/1991 | Royer | |
| 5,010,684 A | 4/1991 | Merving | |
| 5,207,021 A | 5/1993 | Merving | |
| 5,239,773 A | 8/1993 | Doolittle, Jr. | |
| 5,249,391 A * | 10/1993 | Rodgers | A01G 7/06 47/57.5 |
| 5,287,992 A * | 2/1994 | Merving | A01G 7/06 221/185 |
| 5,443,641 A | 8/1995 | Helsing et al. | |
| 5,620,516 A * | 4/1997 | Helsing | B27K 3/0235 118/407 |
| 6,290,416 B1 * | 9/2001 | Gueret | A45D 34/046 401/121 |
| 6,706,344 B1 | 3/2004 | Harlowe, Jr. et al. | |
| 6,852,328 B1 | 2/2005 | Voris et al. | |
| 6,913,805 B2 | 7/2005 | Harlowe, Jr. et al. | |
| 2002/0182353 A1 * | 12/2002 | Harlowe, Jr. | G09B 19/00 428/35.7 |
| 2008/0072690 A1 * | 3/2008 | Kacian | B01L 3/50825 73/864.01 |

OTHER PUBLICATIONS

Leinfelder, R. P., Present Status of Pole Maintenance Procedures, Chapman Chemical Company, Proceedings Wood Pole Institute, 1968, 15 pages.

Hand, O.F., et al., The Control of Fungal Decay and Insects in Transmission Poles by Gas Phase Treatment, Presented at the Changing Polescape: Proceedings of the Fifth Wood Pole Institute, Colorado State University, Jul. 19-21, 1971, 23 pages.

Graham, Robert D., Fumigants Can Stop Internal Decay of Wood Products, Article in Forest Products Journal, vol. 23, No. 2, Feb. 1973, 4 pages.

Cooper, P.A., et al., Factors Influencing the Movement of Chloropicrin Vapor in Wood to Control Decay, Article in Wood and Fiber, Spring 1974 v. 6, 10 pages.

Scheffer, T.C., Bioassay Appraisal of Vapam and Chloropicrin Fumigant-Treating for Controlling Internal Decay of Douglas-Fir Poles, Forest Products Journal, vol. 25, No. 6, Jun. 1975, 7 pages.

Graham, R.D., et al., Fumigants Contorl Wood Piling Decay, Article in World Ports American Seaport, Oct. 1976, 3 pages.

Graham, R.D., et al., Fumigants Can Strol Internal Decay of Douglas-Fir Poles for at Least 5 Years, Article in Forest Products Journal, vol. 26, No. 7, Jul. 1976, 4 pages.

Forest Research Laboratory, Oregon State University, Controlling Biological Deterioration of Wood with Volatile Chemicals, Interim Report 1, Electric Power Research Institute EL-366 ( Research Project 212-1), EPRI Journal, May 1977, 1 page.

Graham, Robert D., et al., Wood Pole Maintenance Manual: inspection and supplmental treatment of douglas-fir and western redcedar poles, Foreset Research Laboratory, Oregon State University, Corvallis, Research Bulletin 24, 68 pages.

Highley, Terry L., et al., Using fumigants to control interior decay in waterfront timbers, Forest Products Journal, vol. 32, No. 2, Feb. 1982, 3 pages.

Hopkinson, Jenny, Longer Life for Wood Poles, Article in EPRI Journal, Nov. 1982, 2 pages.

Helsing, Guy G., et al., Evaluations of Fumigants for Control of Internal Decay in Pressure-Treated Douglas-Fir Poles and Piles, Holzforchung 38, 1984, 5 pages.

Morrell, Jeffrey J., et al., Marine Wood Maintenance Manual: A Guide for Proper Use of Douglas-Fir in Marine Exposures, Forest Research Laboratory, Oregon State University, Corvallis, Oregon, USA, Research Bulletin 48, Oct. 1984, 65 pages.

Eslyn, Wallace E., et al., Efficacy of Various Fumigants in Eradication of Decay Fungi Implanted in Douglas-Fir Timbers, Disease Control and Pest Management, vol. 75, No. 5, 1985, 5 pages.

Morrell, Jeffrey J., et al., Persistence of chloropicrin in western redcedar poles, Article in Forest Products Journal, vol. 35, No. 6, Jun. 1985, 5 pages.

Zahora, Andrew R., et al., Gelatin encapsulation of methylisothiocyanate for control of wood-decay fungi, Article in Forest Products Journal, vol. 35, No. 7, Jul./Aug. 1985, 6 pages.

Graham, Robert D., et al., Wood Poles for the 21st Century, presented at Wood Pole Conference Proceedings, Mar. 10-11, 1986, Portland, Oregon, USA, 8 pages.

Morell, Jeffrey J., et al., Development of Safer Fumigants for Controlling Internal Decay of Western Wood Species, presented at Wood Pole Conference Proceedings, Mar. 10-11, 1986, Portland, Oregon, USA, 8 pages.

Highley, Terry L., Longevity of Chloropicrin and Vapam in Controlling Internal Decay in Creosoted Douglas-fir Timbers Above Ground, Forest Products Laboratory: Forest Service, U.S. Department of Agriculture, Madison, Wisconsin, USA, 1987, 9 pages.

James, Robert J., Remedial Pole Treatments, presented at Wood Pole Conference Proceedings, Nov. 6-7, 1990, Edmonton, Alberta, Canada, 6 pages.

Lindgren, Peter A., Bonneville Power Administration's Wood Pole Management Program, Article presented at International Conference on Wood Poles and Piles, Fort Collins, Colorado, USA, Oct. 25-27, 1989, 15 pages.

Morrell, J.J., Recent Developments in Fumigant Treatment of Electric Transmission Poles, Presented at Wood Pole Conference Proceedings, Portland, Oregon, USA, Oct. 20-21, 1988, 6 pages.

Wang, C.J.K., et al., Fumigant Effectiveness in Creosote- and Penta-Treated Southern Pine Poles, Research Project 1471-2 for State University of New York—College of Environmental Science & Forestry, Syracuse, New York, USA, Jan. 1989, 73 pages.

Schneider, P.F., et al., Distribution of Chloropicrin in Douglas-Fir Poles 1 to 7 Years After Remedial Treatment, Article in Forest Products Journal, vol. 45, No. 1, Jan. 1995, 2 pages.

Morell, J.J., et al., Performance of Gelled, Pelletized, and Liquid Metham Sodium as Internal Remedial Treatments for Douglas-Fir Poles, Article in Forest Products Journal, vol. 48, No. 10, Oct. 1998, 5 pages.

Morell, J.J., et al., Seven-Year Performance of Glass-Encapsulated Methylisothiocyanate, Article in Forest Product Journal, vol. 48, No. 1, Jan. 1998, 7 pages.

(56) References Cited

OTHER PUBLICATIONS

Morell, Jeffrey J., et al., Fumigant Treatment of Douglas-Fir Bridge Timbers, Article in Forest Products Journal, vol. 63, No. 3/4, 2013, 3 pages.
Copper Care Wood Preservatives, Inc., Product Catalog containing Rino-Plug, Feb. 2015, 10 pages.
Poles, Inc., Plastic Removal Plugs, URL: http://poles.com/epages/08fd78c5-abfa-4217-9263-68fec9605ccc.sf/en_US/?ObjectPath=/Shops/08fd78c5-abfa-4217-9263-68fec9605ccc/Categories/Products/3/16, Retrieved from the Internet on May 22, 2017, 3 pages.

* cited by examiner

WOOD TREATMENT DEVICE

CROSS-REFERENCE

This application claims the benefit of U.S. Provisional Patent Application No. 62/342,331, filed May 27, 2016, which application is incorporated herein by reference in its entirety for all purposes.

BACKGROUND

It is well documented that wood fumigants have improved safety, reliability, and longevity of wood structures exposed to the environment.

Trichloronitromethane (also known by the proprietary names chloropicrin, timberfume, timberfume II, chloropicrin 100, and Chloro-Pic) has been proven through research and commercial practice to be an effective and long lasting fumigant used for controlling internal deterioration of wood structures since the mid-1960s. However, it has not gained wide acceptance for general use.

Trichloronitromethane has been used within electrical utility poles, railroad trestles, roadway bridges, beams, and timbers in wood buildings. Although it is registered with the U.S. Environmental Protection Agency (EPA) for this use in wood, there has been a reluctance to use it because of its strong lacrimation property. This property also makes it useful as a tear gas in crowd control and a warning agent incorporated into dangerous odorless gases used for house fumigation. Many utilities and contractors in the past have chosen to use less effective supplemental wood treatments that are easier to apply.

To prolong the life of wood members, holes are drilled into the member, a wood-treatment agent is then inserted into the holes, and the holes are sealed. It is common for the holes to be sealed using a piece of wood dowel or a plastic plug.

SUMMARY

A wood treatment device may include a container and a closure assembly. In some embodiments, the container may include an elongate body with opposite ends, with at least one of the opposite ends being an open end. The container defines an internal expanse for holding a wood-treatment agent in fluid communication with the open end. The container may be made of a material that is non-permeable and non-reactive to the wood-treatment agent. The closure assembly may be configured, when positioned at the container open end, to close at least partially the open end. The closure assembly may include a release unit having an inner face exposed to the internal expanse and an outer face facing away from the internal expanse. The release unit may be permeable to the wood-treatment agent and configured to impede passage of the wood-treatment agent through the release unit.

In some embodiments of a wood treatment device, the container has an elongate body with opposite ends, with at least one of the opposite ends being an open end. The body defines an internal expanse for holding a wood-treatment agent, and may be made of a material that is non-permeable and non-reactive to the wood-treatment agent. The opposite ends may each have a neck section extending from the body and a lip section adjacent to the neck section and distal of the body. The neck section may be narrower than the lip section. The closure assembly may be configured, when positioned at the container open end, to retain the wood-treatment agent in the internal expanse. The wood treatment device may also include an adapter extending distally of the container. The adapter may have an exposed surface facing the container and defining an opening. The opening may extend axially from a distal end of the adapter toward the container past the exposed surface and radially between the exposed surface and the container. The opening may be configured to allow a foot of an elongate manipulation tool to be moved through the opening and pivoted laterally to a position between the exposed surface and the container.

Features, functions, and advantages may be achieved independently in various embodiments of the present disclosure, or may be combined in yet other embodiments, further details of which can be seen with reference to the following description and drawings.

DESCRIPTION

Various embodiments of a wood treatment device having a container with an open end and a closure assembly are described below and illustrated in the associated drawings. Unless otherwise specified, a wood treatment device and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other configurations of wood treatment devices. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

A wood-treatment device as described provides a confined encasement for trichloronitromethane or other fumigant into a vial that easily slips into standard bored treatment holes commonly used in wood maintenance practice throughout the United States and other countries. The application process is easy and safe for workers applying this treatment. In some examples, when the device is installed in a wood member, the release of trichloronitromethane at a desired rate may be delayed until after the treatment hole is capped, plugged and/or sealed, confining this chemical within the targeted wood member.

The following describes selected aspects of exemplary wood treatment devices as well as related methods. The examples in these sections are intended for illustration and should not be interpreted as limiting the entire scope of the claimed inventions. Each example may include one or more distinct inventions, and/or contextual or related information, function, and/or structure.

Figure 1:
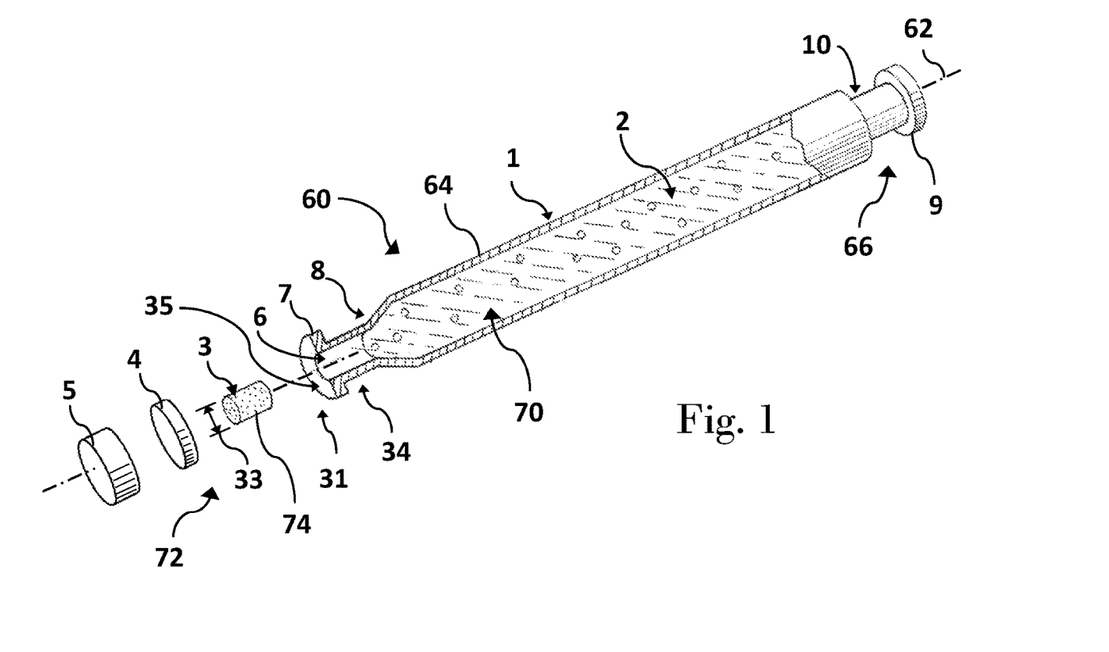
FIG. 1 is an exploded, partial cross-sectional view of an embodiment of a wood treatment device filled with a fumigant and positioned with a release end in a downward facing orientation for insertion into a bore in a wood member.

Referring initially to FIG. 1, a first example of a wood treatment device, shown generally at 60, includes a container 1, also referred to as a container. Container 1 is elongate extending along a longitudinal axis 62. Container 1 preferably has a cylindrical body 64, although it may have other shapes, with opposite ends 66, 31. Body 64 has an internal expanse 70 configured to contain a chemical composition 2, also referred to as a wood treatment agent. In this example, container end 66 is a closed end and container end 31, also referred to as a release end, is an open end. In other examples, both ends are open with a closure assembly 72 on both ends.

Chemical composition 2 may be any composition and have any state, such as a solid, a liquid, or a gas, that is suitable for a particular application. For wood preservation, a volatile fumigant such as chloropicrin may be used. Wood treatment device 60 may be used to contain such chemical composition 2 during storage, transportation, and/or treatment. For example, enclosed chemical composition 2 may be a liquid, an oil or water-soluble mixture, a solid fumigant, or an emulsion comprised of fungicides and/or insecticides.

Figure 2:
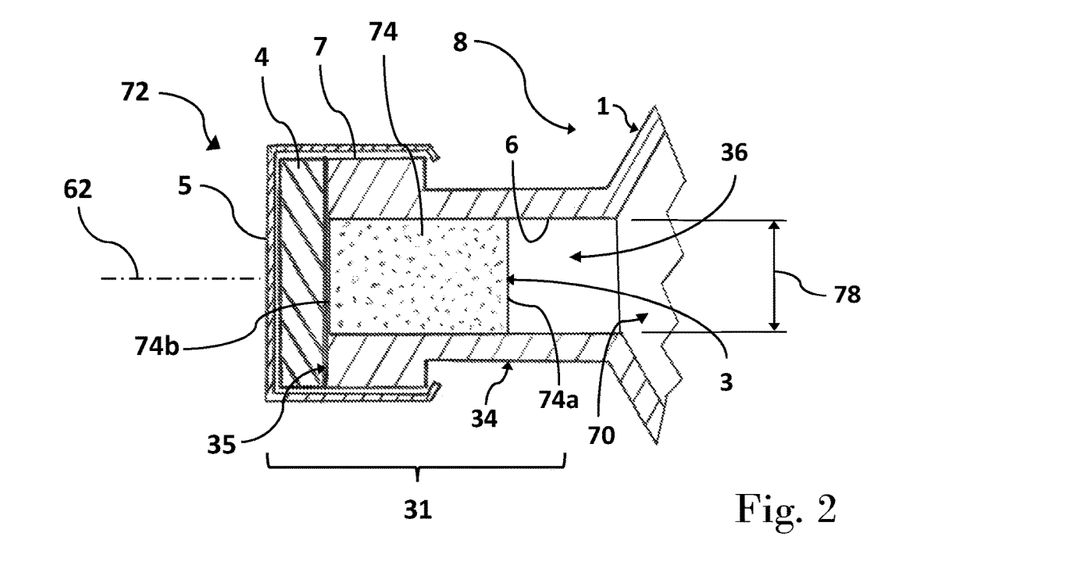
FIG. 2 is an enlarged cross section of the release end of the wood treatment device of FIG. 1 as assembled.
Figure 3:
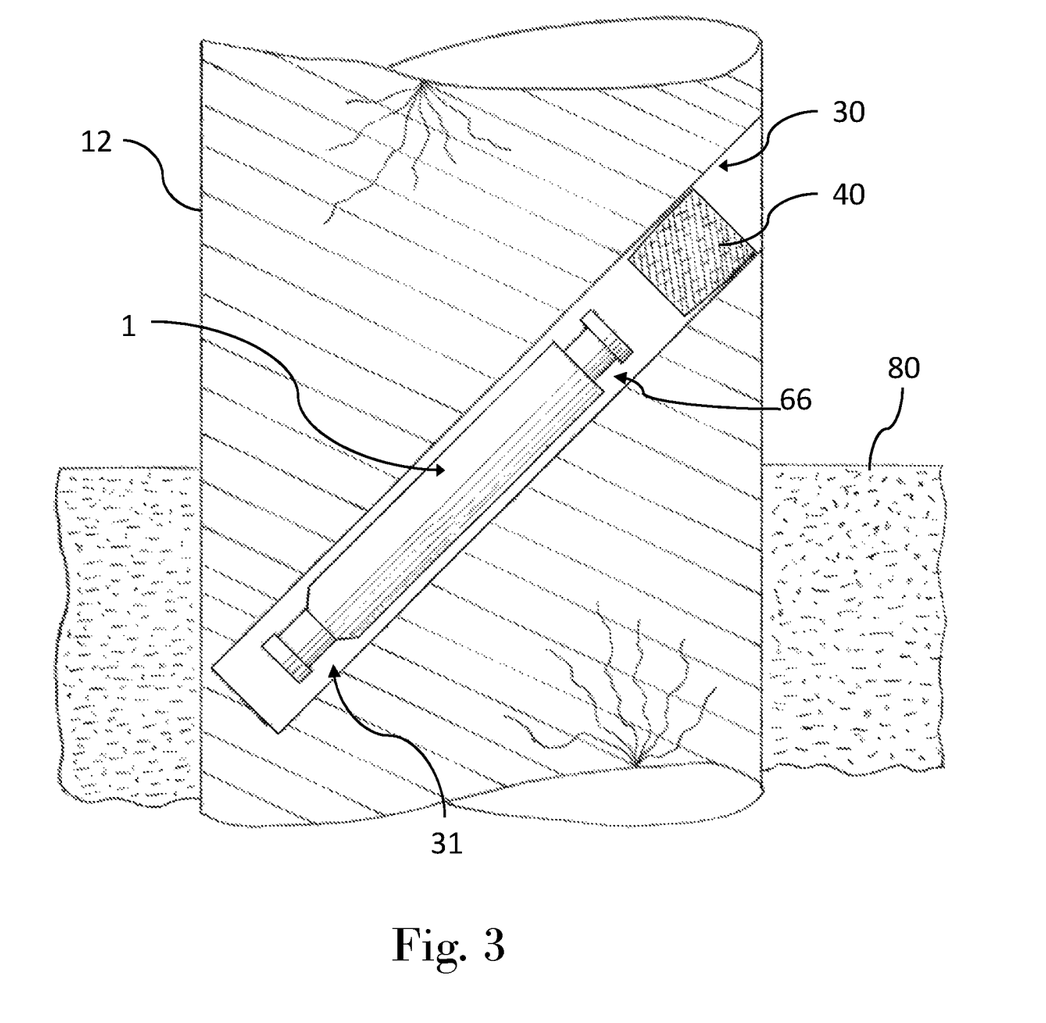
FIG. 3 is a cross-section of the wood treatment device of FIG. 1 in an angled orientation in a bore in a wood member.

Wood treatment device 60 also includes a closure assembly 72 for closing open end 31. Closure assembly 72 is shown in exploded view in FIG. 1. FIG. 2 is an enlargement of closure assembly 72 as assembled on open end 31 of container 1. Closure assembly 72 includes a controlled release mechanism 3, also referred to as a release unit, that preferably controls a release rate of the contained fumigant and that may avoid workman exposure to the chemical during the installation of wood treatment device 60 into an application position, such as in a bored holes 30 within a wooden structure or member 12 subject to internal biological deterioration, as particularly shown in FIG. 3. In FIG. 3, wooden member 12 is a utility pole supported in earth 80 or other support medium.

Furthermore, the rate of release may be set or selected from available options to avoid public exposure during treatment of target wood member 12, such as a pole, piling, or timber. The rate of chemical release from container 1 can be set by the selection of materials for making and or of a design of release mechanism 3 for a particular chemical composition 2 that provide release in specific time frames that can vary from immediately to 10 years or longer. The individual projects and persons responsible can determine if immediate release of chemical composition 2 is prudent and safe.

Container 1 may be a hollow container of any desired dimensions. These dimensions are governed by the requirements of the specific application. For example, within wooden utility poles the dimensions are determined by the size of the bore holes drilled to contain the device during the treatment period. A typical bore hole dimension would be ⅞ inch in diameter by at least 11 inches long, but can vary depending on the maintenance specifications of the structure owner.

Open end 31 of container 1 has an inside bore 6 in a neck section 34 that provides an open-end passageway 36 through which chemical composition 2 may flow from internal expanse 70 to exterior of wood treatment device 60. Neck section 34 is also referred to as an open-end section. In this example, controlled release mechanism 3 is a plug 74 of suitable chemical composition 2. There is preferably a snug-fit tolerance between inside bore 6 and plug 74. Plug 74 has an inner face 74a and an outer face 74b.

Closure assembly 72 further includes a gasket 4, also referred to as a seal, and a crimp cap 5. The distal end of open end 31 is preferably sealed with gasket 4 to prevent release of chemical composition 2 prior to installation. Controlled release mechanism 3 and gasket 4 are preferably made of a material which is selected by considering the expected life of controlled release mechanism 3 and the ability of the controlled release component to not degrade or breakdown with exposure to the contained chemical composition. The selected component material may be comprised of a metal, plastic polymer, ceramic, or similar material. Controlled release mechanism 3 material may be structured as a membrane, porous inert matter, have a labyrinth configuration, or be a limited orifice. Controlled release mechanism 3 in this example has an outer diameter 33 that is slightly larger than a container opening diameter 78 of inside bore 6 that fills fluid passageway 36 in inside bore 6, preventing leakage around controlled release mechanism 3.

During storage and transportation, open end 31 of container 1 is sealed with gasket 4 followed by crimp cap 5. Open end 31 includes a cylindrical lip section 7 on a distal end of the open end and a cylindrical neck section 8 connecting the lip section to container body 64. Closed end 66 and open end 31 have the same configuration in this example. Accordingly, closed end 66 includes a lip section 9 and a neck section 10 having the same respective shapes as lip section 7 and neck section 8.

Crimp cap 5 fits over raised lip section 7 bringing gasket 4 to mate, surface to surface, with a container face 35 on the distal end of open end 31. Crimp cap 5 is compressed and formed around lip section 7 and forces gasket 4 to seal against container face 35. When the device is ready to install into the targeted wood member, crimp cap 5 and gasket 4 are removed. The device is then inserted into bore hole 30 within the wood member and then the hole is preferably immediately sealed with a suitable plug, such as a wooden or plastic polymer plug type component 40 that is screwed or tapped into the end of open bore hole 30.

Additional Examples

Figure 4:
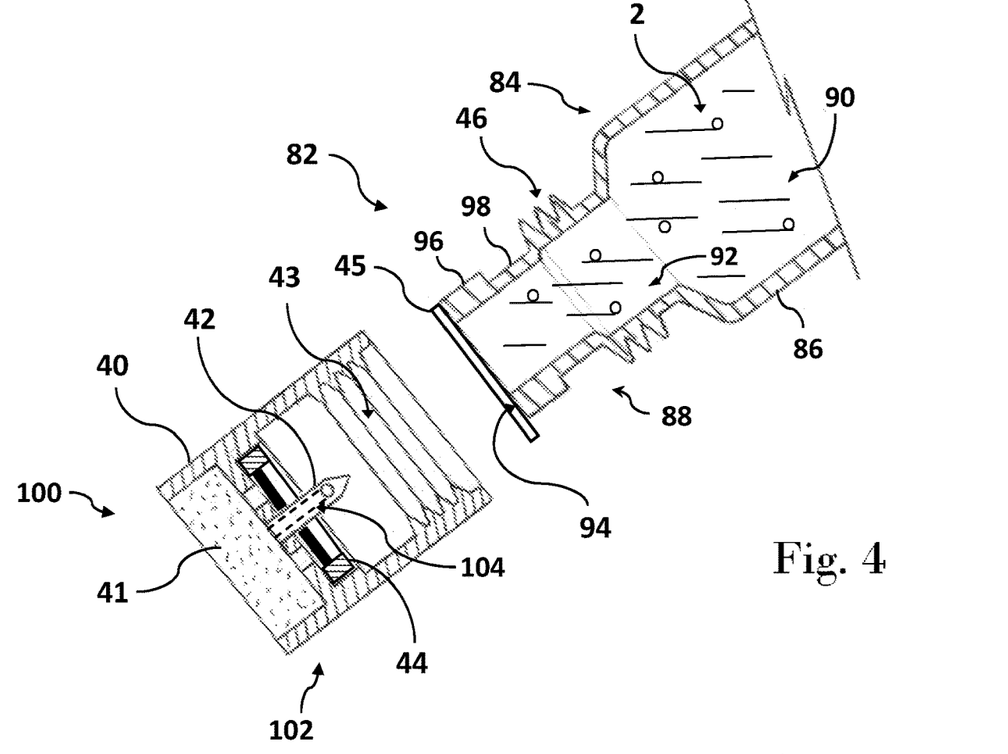
FIG. 4 is a cross section of a release end of another embodiment of a wood treatment device having a screw-on controlled release cap prior to attachment of the cap to a container of the wood treatment device, with the wood treatment device shown in a downward facing orientation.
Figure 5:
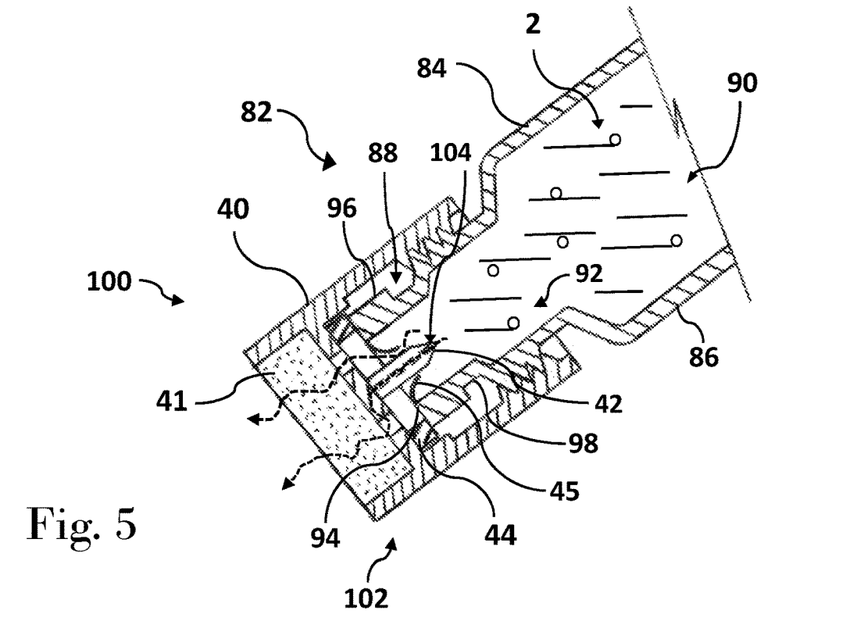
FIG. 5 is a cross section of the release end of the wood treatment device of FIG. 4 showing the release cap attached to the container.

Referring now to FIGS. 4 and 5, another example of a wood treatment device is shown in general at 82. Wood treatment device 82 includes a container 84 having a body 86, an open end 88, and an opposite end not shown. The opposite end may be a closed end configured similar to closed end 66 of container 1 but conforming to the distal end of open end 88, described below. Alternatively, the opposite end may be an open end like open end 88. Container 84 has an internal expanse 90 and open end 88 that defines an end passageway 92 that provides fluid communication between internal expanse 90 and distal end face 94.

Open end 88 includes a distal lip section 96 having a greater diameter than an adjacent neck section 98, similar to open end 31 of wood treatment device 60. External threads 46 are disposed on the outside of open end 88 between neck section 98 and body 86 of container 84. During manufacture, a chemical composition 2 is placed in the internal expanse of container 84. Open end 88 is then sealed with a film 45, also referred to as a seal, attached to end face 94, closing end passageway 92.

Wood treatment device 82 also includes a closure assembly 100. Closure assembly 100 includes film 45, a cap assembly 102, a needle 42, also referred to as a release tool, and a controlled release component 41, also referred to as a release unit. Cap assembly 102 includes a cap 40 that fits on open end 88. Cap 40 includes internal threads 43 configured to mate with external threads 46. Cap 40 is screwed onto open end 88 using internal threads 43 and external threads 46 on open end 88 of container 84 to secure the two together.

When manufactured, a chemical composition 2 is placed into internal expanse 90 of container 84 and open end 88 is sealed with film 45 on open end face 94., Needle 42 is supported in cap 40 so that it projects into the inside of cap 40 away from controlled release component 41. As cap 40 is screwed on, the needle extends into closed-end passageway 92 and pierces film 45 to establish a treatment agent passageway 104 for the chemical composition to flow out of internal expanse 90 and into controlled release component 41. Needle 42 is hollow, with openings near the top and base, or has channels along the sides for allowing chemical composition 2 to migrate internally past film 94. The needle can be round or square, or have a multitude of other shapes, and can have other configurations that allow fluid to flow past it, such as open channels or a textured surface. Cap 40 tightens against a sealing element 44 positioned to contact open-end face 94, which seals cap 40 to container 84. Chemical composition 2 is then forced to flow through and/or around needle 42 and into controlled release component 41. Chemical composition 2 migrates to controlled release component 41 and releases at a rate depending on the selection of material in the controlled release component.

Figure 6:
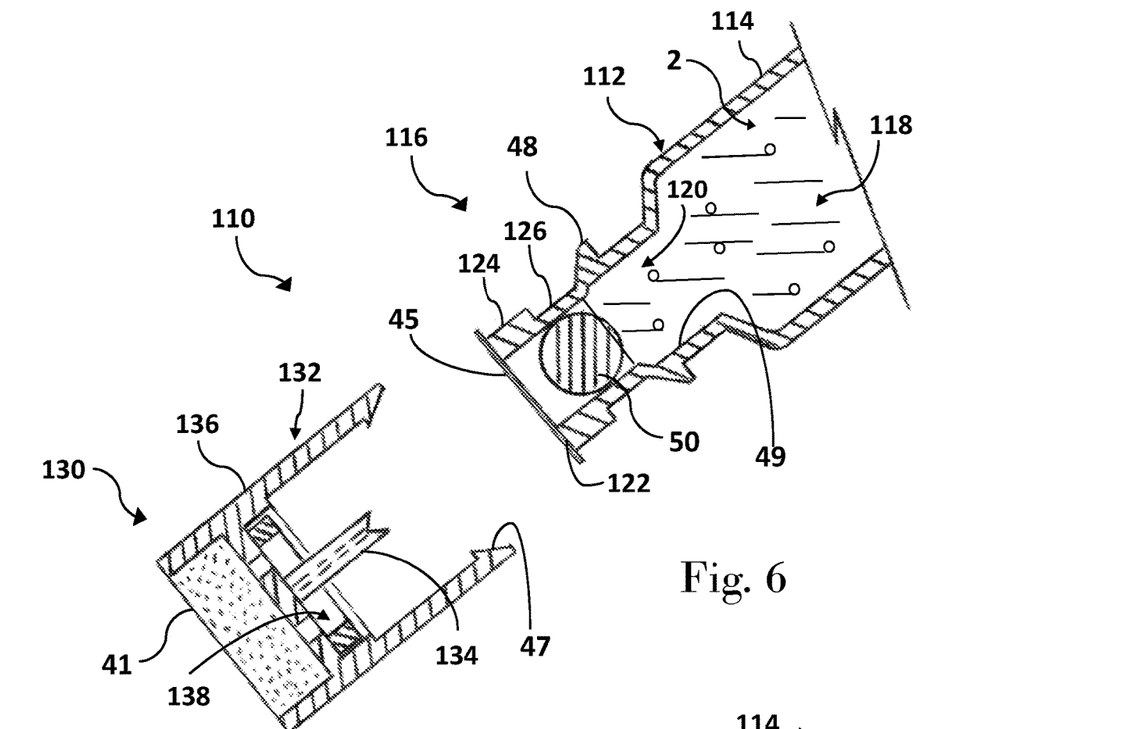
FIG. 6 is a cross section of another embodiment of a wood treatment device having a snap-on controlled release cap prior to attachment of the cap to a container of the wood treatment device, with the wood treatment device shown in a downward facing orientation.
Figure 7:
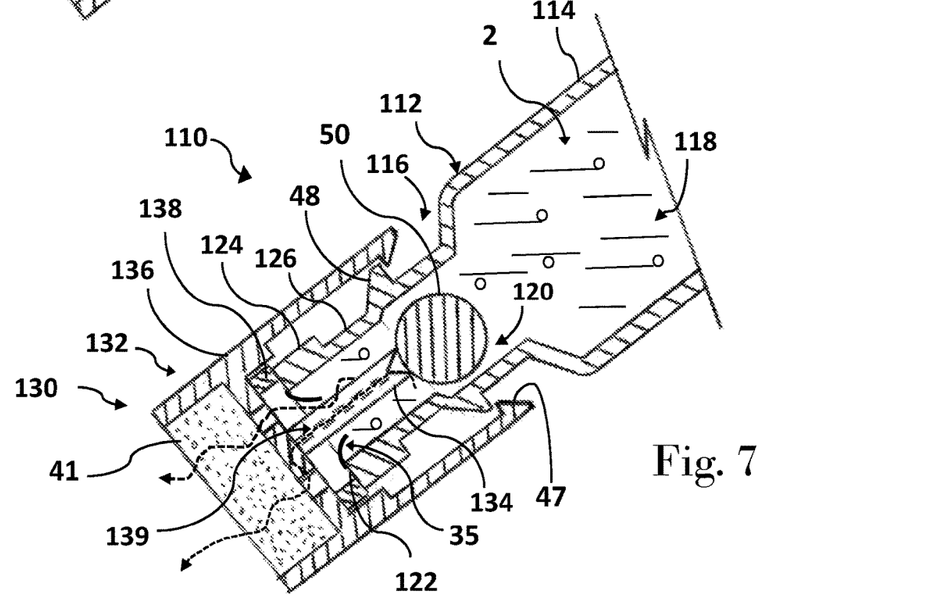
FIG. 7 is a cross section of the release end of the wood treatment device of FIG. 6 showing the release cap attached to the container.

Another example of a wood treatment device is shown generally at 110 in FIGS. 6 and 7. Wood treatment device 110 includes a container 112 having a body 114, an open end 116, and an opposite end not shown. The opposite end may be a closed end configured similar to closed end 66 of container 1 but conforming to the distal end of open end 116, described below. Alternatively, the opposite end may be an open end like open end 116. Container 112 has an internal expanse 118 and open end 116 that defines an end passageway 120 that provides fluid communication between internal expanse 118 and a distal end face 122.

Open end 116 includes a distal lip section 124 having a greater diameter than an adjacent neck section 126, similar to open end 31 of wood treatment device 60. An external, projecting rib 48 extends partially or completely circumferentially around open end 116 between neck section 126 and body 114 of container 112. During manufacture, a chemical composition 2 is placed in the internal expanse of container 112. A ball cork 50 is press-fit into open end 116 adjacent to end face 122. Open end 116 is then sealed with a film 45, also referred to as a seal, attached to end face 122, closing end passageway 120.

Wood treatment device 110 also includes a closure assembly 130. Closure assembly 130 includes film 45, a cap assembly 132, a broad-tipped needle 134, also referred to as a release tool, and a controlled release component 41, also referred to as a release unit. Cap assembly 132 includes a cap 136 that fits on open end 116. Cap 136 includes an internally projecting rib 47 that is positioned to engage projecting rib 48 when cap 136 is placed over open end 116.

Cap 136 presses onto open end 116 of container 112 and snaps into the position shown in FIG. 7 with end face 122 seated against a sealing ring 138. During placement of the cap onto the open end, angled rib 47 in the cap contacts mating rib 48 on container 112, and slides over rib 48 to seat beyond rib 48, capturing cap 136 in a snap-fit configuration on open end 116, as shown. Sealing film 45 can be peeled off prior to placement of the cap on the open end, or the film is pierced by needle 134. When cap 136 is pressed on, needle 134 pierces film 45, if necessary, and pushes ball-cork 50 into a larger diameter neck opening 49 of container 112, allowing chemical composition 2 to flow from internal expanse 118 through a treatment agent passageway 139, through controlled release component 41, and then into the exterior of wood treatment device 110 to the treated wood member.

Quick Release Plunger Cap

Figure 8:
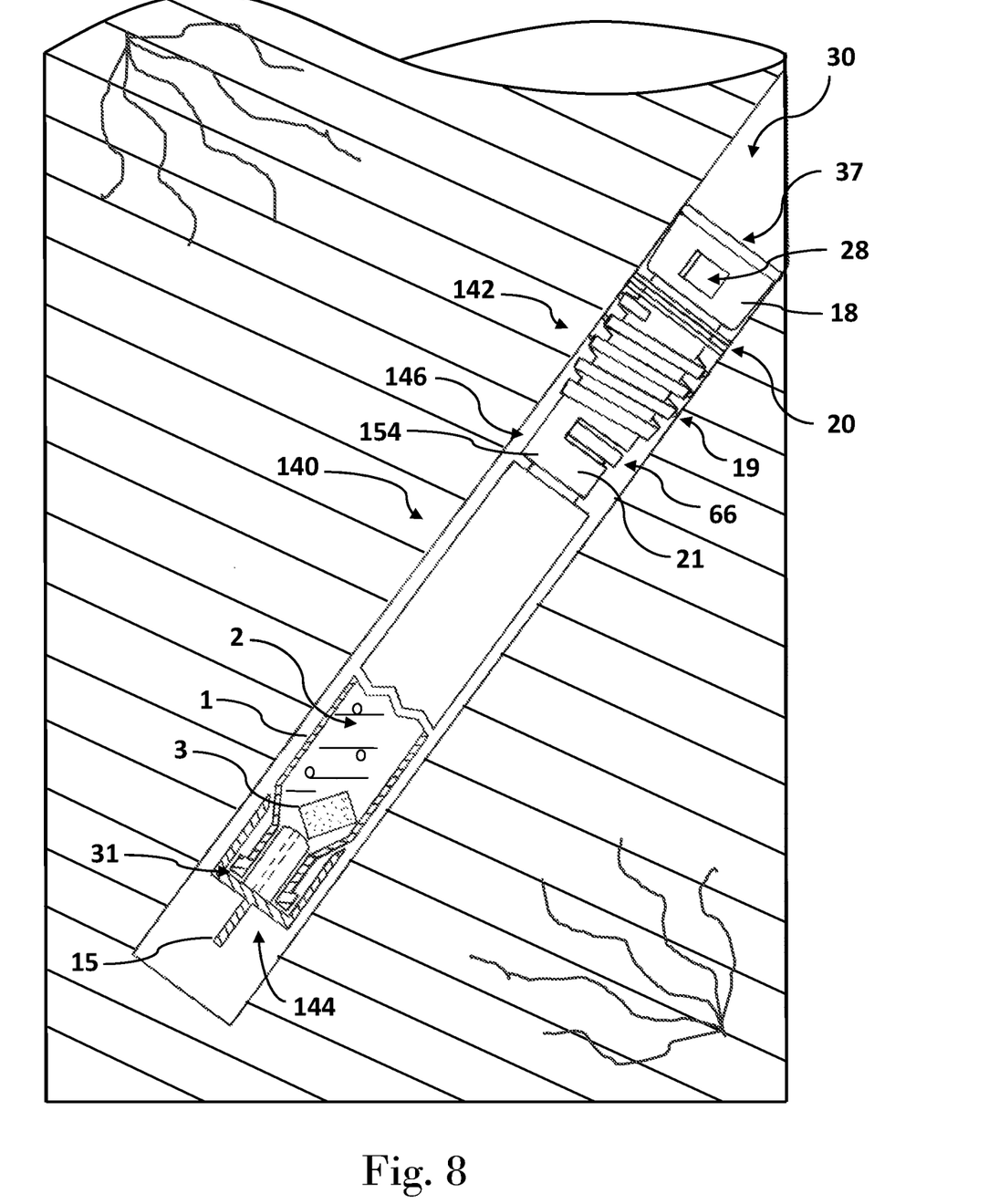
FIG. 8 is a partial cross section of another embodiment of a wood treatment device having a quick release cap installed onto a release end of the container of FIG. 1 and a screw plug attached to the other end of the container, the wood treatment device being shown inserted into a bore in a wooden member.

FIG. 8 illustrates a wood treatment device 140 including a container 1, as illustrated in FIG. 1, a closure assembly 72, and an adapter 142. Closure assembly 72 includes controlled release mechanism 3 in the form of controlled-release plug 74, a cap assembly 144 in the form of a quick release plunger cap 15.

Quick release plunger cap 15 is a cap that is placed over the release end of the container and is hand pressed on until firmly secured. Utilizing the quick release plunger cap allows the applicator sufficient time to avoid contact with the chemical composition when the wood treatment device is inserted into bore 30. The intent is to sequentially have bore hole 30 ready to receive the treatment and the wood treatment device ready to insert into bore hole 30. Container 1 is then activated by hand pressing quick release plunger cap 15 securely onto open end 31 of container 1 and, without interruption, insert the wood treatment device into bore hole 30.

In situations when it is deemed necessary to defeat the slow release mechanism, quick release plunger cap 15 is used to enable a faster release of chemical composition from the wood treatment device. Referring to FIG. 8, wood treatment device 140 is illustrated with quick release plunger cap 15 inserted to defeat controlled release mechanism 3, as explained further below. Quick release plunger cap 15 defeats controlled release mechanism 3 by cutting, breaking, removing or pushing controlled release mechanism 3 into the internal expanse of container 1. Open end 31 and quick release plunger cap 15 are oriented in the downward position inside bore 30 of wood member 12 to be treated, to allow the chemical composition, when in liquid form, to drain out. After defeating controlled release mechanism 3, chemical 2 is able to drain out of container 1 in approximately 1 to 24 hours. When quick release plunger cap 15 is pressed into a seated position on open end 31 as shown in FIG. 8, there is an interference fit between the outer edges of fins 13, shown in FIG. 11, and the inside walls of the open end within neck section 34 of container 1 that allows quick release plunger cap 15 to be retained in position.

Figure 9:
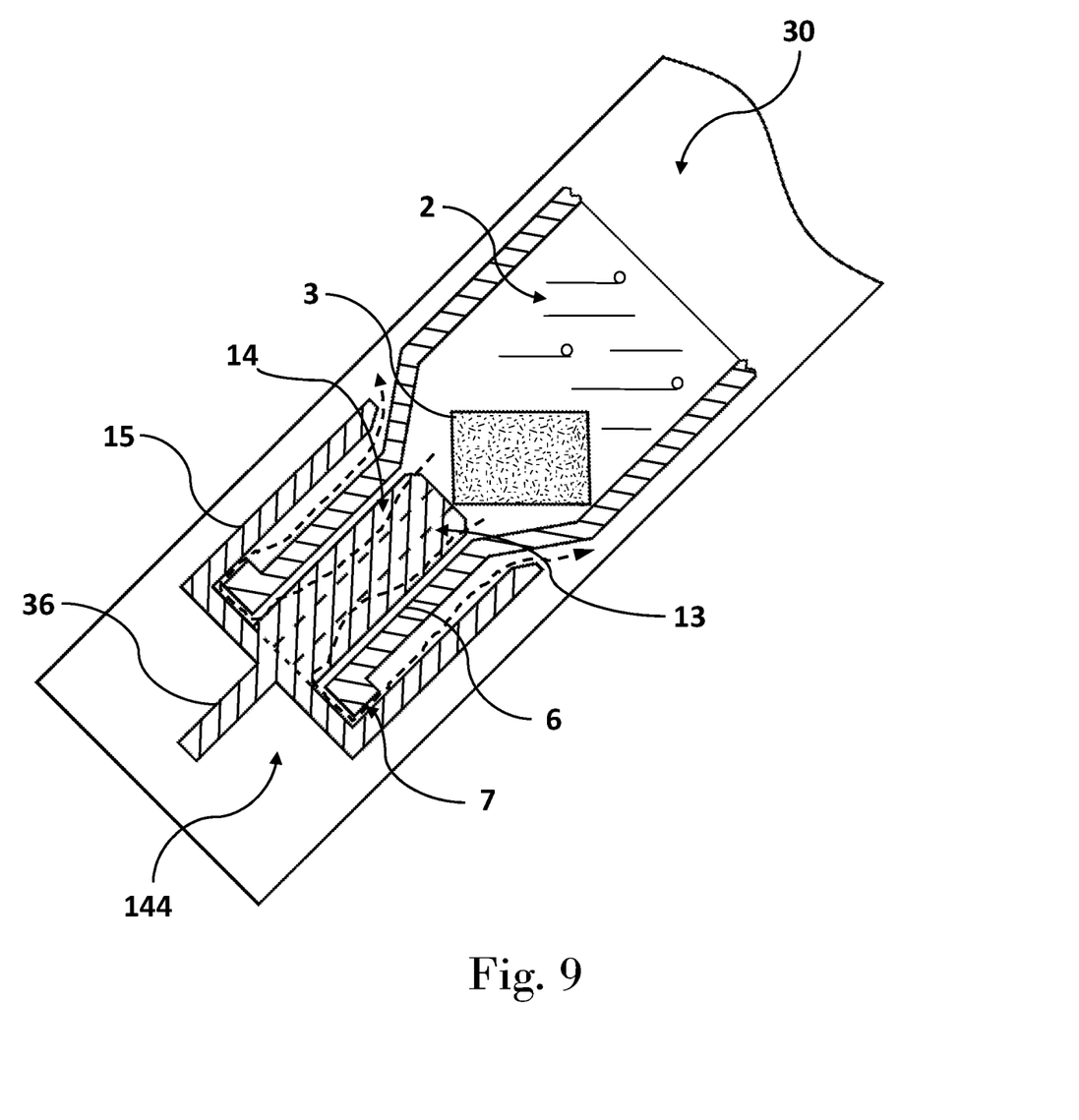
FIG. 9 is an enlarged view of the quick release cap and release end of the container of the wood treatment device shown in FIG. 8.
Figure 10:
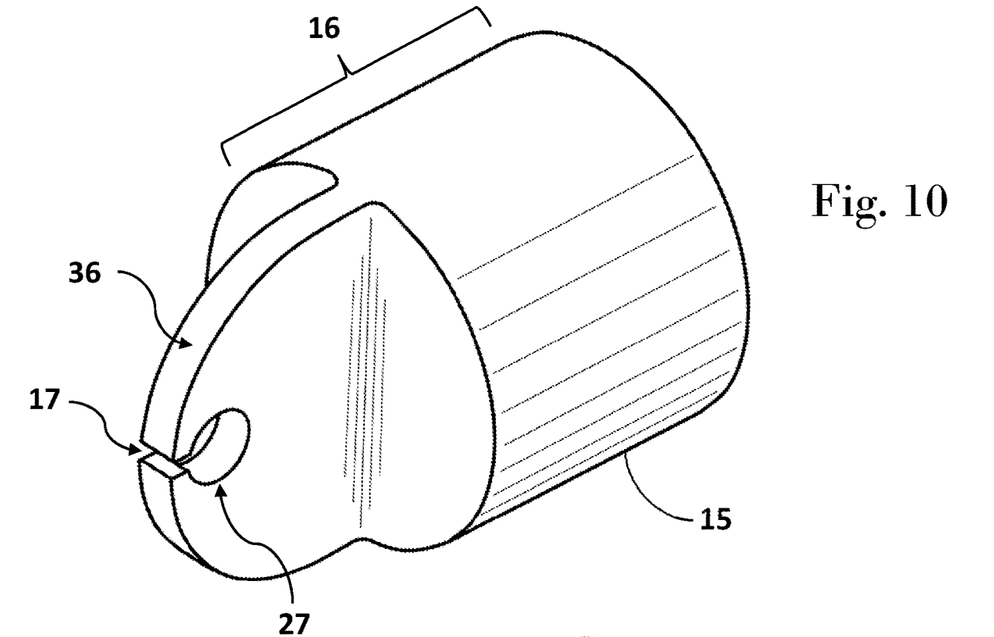
FIG. 10 is an isometric view of the quick release cap shown in FIG. 8.
Figure 11:
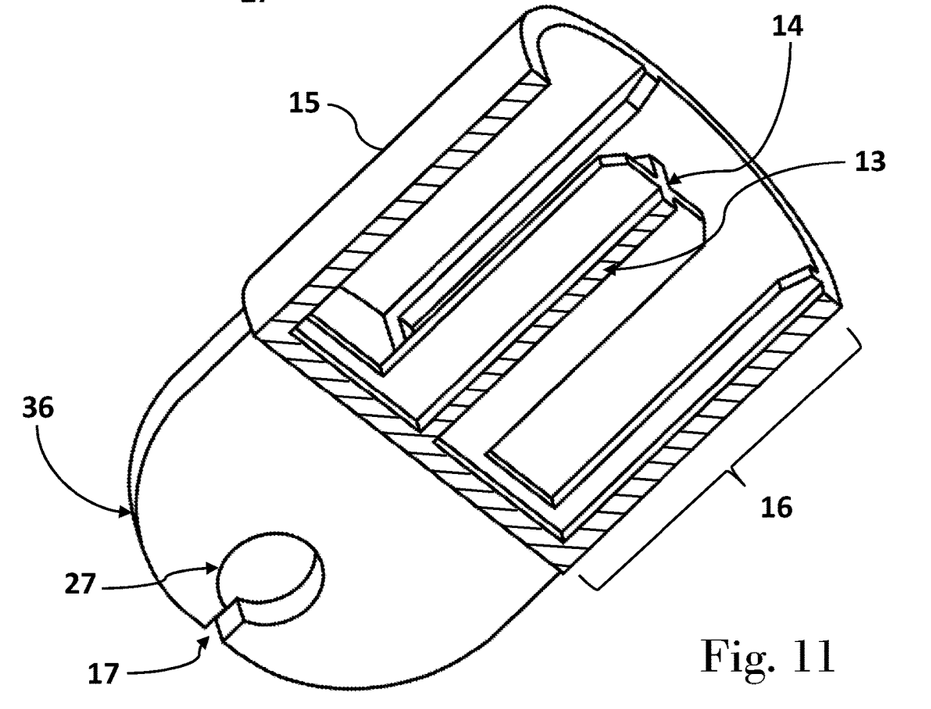
FIG. 11 is a cross section of the quick release cap shown in FIG. 8.

FIG. 9 shows an enlargement of the quick release plunger cap inserted on open end 31. FIGS. 10 and 11 illustrate quick release plunger cap 15. Quick release plunger cap 15 has a round outer body 16 (also referred to as a shroud), a handle 36, and a plunger portion 14. When there is an application for a quick release of chemical 2, plunger portion 14 is aligned to inner bore 6 within neck 34 of container 1. Round outer body 16 fits over open end 31 of container 1, provides guidance, and acts as a shield from the escape of vapors or liquid when quick release plunger cap 15 is hand pressed on. As the plunger cap is pressed onto open end 31 of container 1, it displaces control release plug 74, and moves it into container 1. Plunger portion 14 is comprised preferably of a series of two or more ribs 13 that extend out from a common center point. Ribs 13 are configured so they allow chemical composition 2 to wick out of container 1 and into bore hole 30 and to allow air to migrate in to displace the released chemical composition.

On a handle end 36 of quick release plunger cap 15 there is a hole 27 and a slot 17. A cord (not shown) may be passed through the slot to the hole on each of several quick release plunger caps. The cord can thus retain a multitude of quick release plunger caps 15 for easy retrieval when using in the field. Quick release plunger cap 15 preferably is comprised of a material that does not degrade in the presence of chemical composition 2.

Adapter

Referring to FIGS. 8 and 12-15, wood treatment device 140 may include an adapter, referred to as a screw plug 18 that is configured to be attached to either end of container 1 or other container described above. In some examples, only one end of container 1 is configured to be secured by screw plug 18, which one end may be an open end or a closed end. Such containers may be used with or without an adapter. For example, wood treatment device 60 shown in FIG. 1 does not include an adapter. On the other hand, wood treatment device 140 shown in FIG. 8 does include an adapter. An adapter like screw plug 18 may also be used on wood treatment devices 82 and 110. In the example shown, screw plug 18 may be used to seal the bore hole from chemical escape, may support the container in the bore hole, and may facilitate manipulation of the container when the container is installed in or removed from the bore hole during installation or retreatment, or for quality assurance inspections by wood structure owners.

Figure 12:
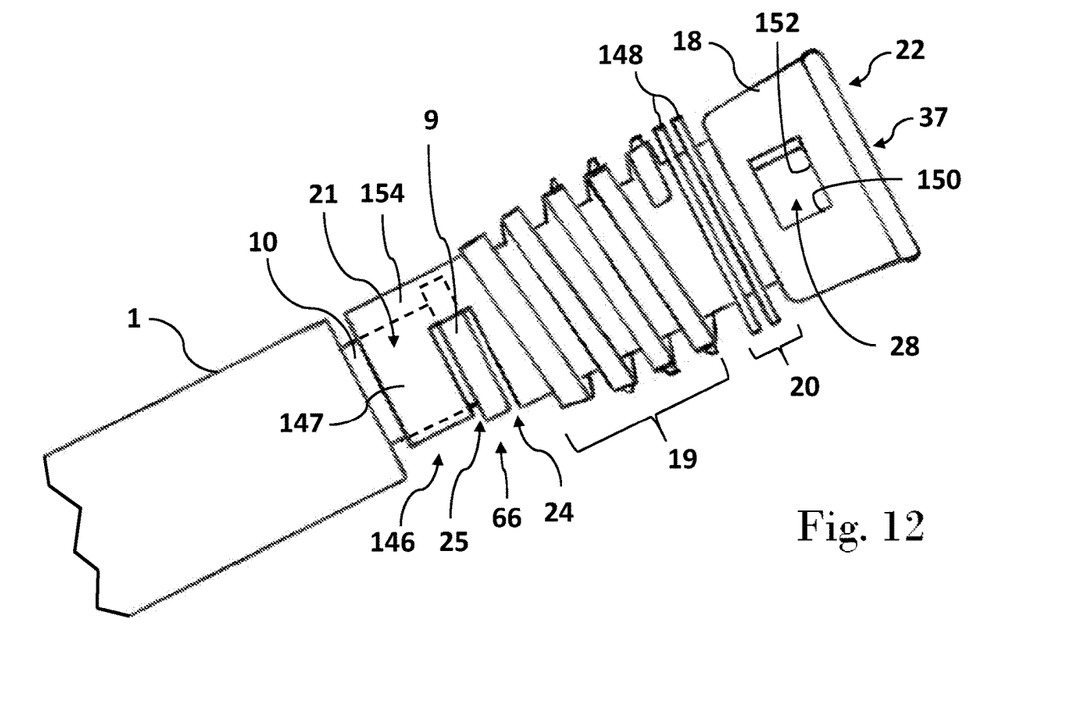
FIG. 12 is an enlarged side view of the end of the container of the wood treatment device of FIG. 8 attached to the screw plug.
Figure 13:
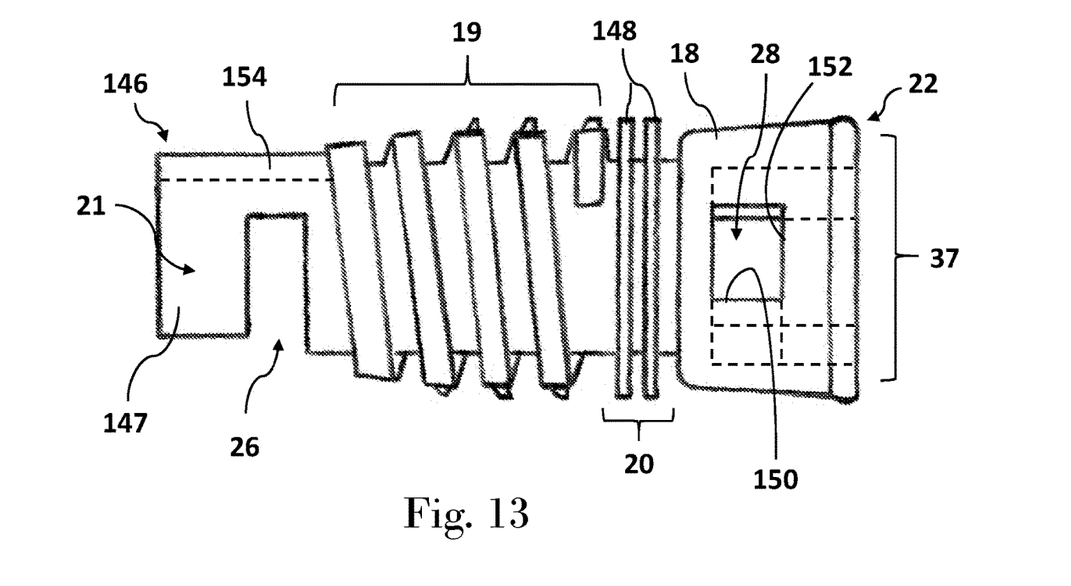
FIG. 13 is a further side view of the screw plug shown in FIG. 12.

Screw plug 18 is configured to engage raised lip section 7 or 9, depending on which end of container 1 it is attached to. The lip section preferably has a size equal to or slightly smaller than the outer dimension of container body 64. Lip sections 7, 9 have approximately the same width or diameter and length. Neck sections 8, 10 are smaller in diameter than lip sections 7, 9. Screw plug 18 is attached to either end 31 or end 66 of container 1 depending on the choice of vapor phase or liquid phase of release.

For a vapor-phase release, open end 31 is positioned above closed end 66. In this application, screw plug 18 is attached to open end 31 in a downwardly directed bore hole, or to closed end 66 in an upwardly directed bore hole. For a liquid-phase release, open end 31 is positioned below closed end 66, as is shown in FIGS. 3 and 8. In this case screw plug 18 is attached to open end 31 in an upwardly directed bore hole, or to closed end 66 in a downwardly directed bore hole. An adapter may be configured to attach to container 1 by any suitable mechanism, such as by press-fit, by interference fit, by screwing on with threads, or by snapping the plug component over the lip section of ends 31, 66.

Insertion, Sealing and Removal Using Adapter

During Installation and treatment of a wood member, container 1 may be attached or clipped onto screw plug 18. Screw plug 18 allows the two components, container 1 and screw plug 18, to be connected at all times during installation, treatment, and removal from bored holes within a wood member.

Screw plug 18 includes a bore hole sealing feature that aids in the installation and removal of container 1 for replacement of an emptied container 1 with a fully charged container 1. In addition, utilizing screw plug 18 allows container 1 to be removed at any time for purposes such as quality assurance inspections.

Figure 15:
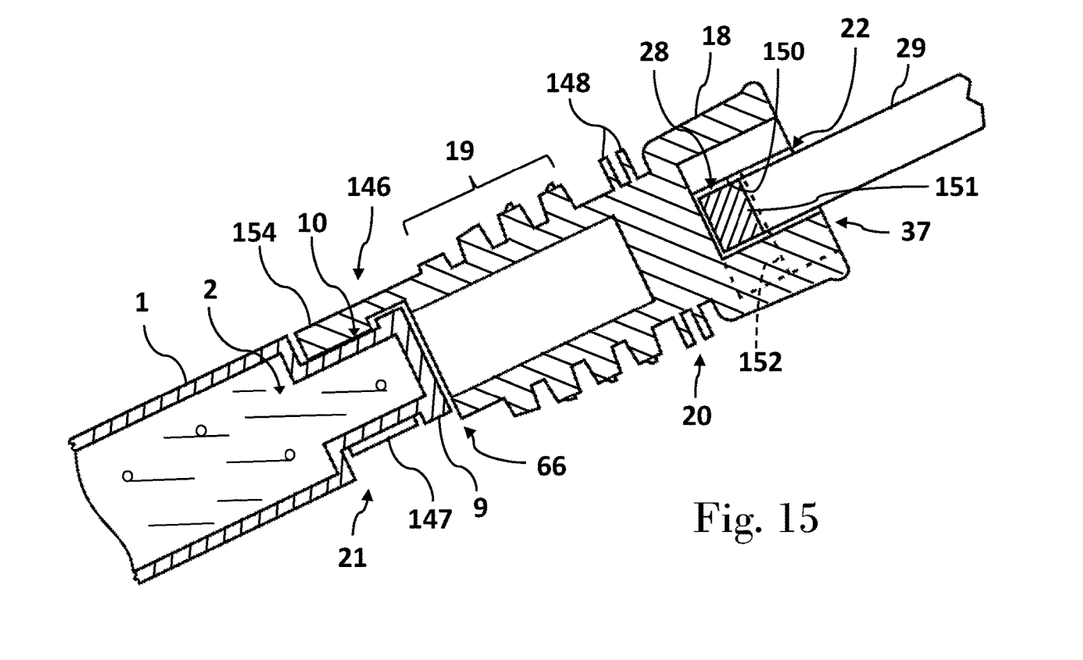
FIG. 15 is a cross section taken along the length of the screw plug shown in FIG. 12.

FIGS. 8, 12, and 15 show container 1 attached to screw plug 18. Screw plug 18 is generally round or cylindrical in shape with external threads 19, a sealing section 20, and attachment component 146 on a proximal end 21, and a tool interface component 22, on the other, distal end 37. Screw plug 18 is designed to positively capture (be attached to) container 1 before it is installed into treatment bore 30. Prior to installation, screw plug 18 is connected onto container 1, over ends 8 or 10, depending on the intended orientation of the device. Proximal end 21 of screw plug 18 is hand pressed down over neck section 8 or 10 of container 1.

Attachment component 146 includes two arched fingers 147 extending circumferentially around opposite sides from a common spine 154 on each side of screw plug 18 deflect outward allowing container 1 to slide into a central axis location and fingers 147 to return to their normal position. The ends of fingers 147 are spaced apart by a gap 23 that is sized slightly smaller than the diameter of neck sections 8 and 10. Screw plug 18 is attached to the container end by pressing gap 23 against the neck portion, causing fingers 147 to deflect away from each other. The neck portion passes between the fingers and fits into an internal space surrounded by fingers 147. The internal space in attachment component 146 of container 1 is now captured by screw plug 18 and held in the same central axis as screw plug 18.

Container 1 is retained by fingers 147 that wrap around container 1 on either end 31 or 66, with the addition of raised lip section 7 or 9 fitting into a slot 26 of screw plug 18. Raised lip section 7 or 9 retains container end 31 or 66 in end 21 of screw plug 18 and prevents it from slipping out. Slot 26 is longer longitudinally than the thickness of lip section 7 or 9, resulting in gaps 24, 25 between container lip section 7 or 9 and screw plug 18, that allows the screw plug to rotate relative to container 1 in case there is binding in treatment bore 30.

External threads 19 wrap around the exterior of screw plug 18. Threads 19 assist with the installation and removal of the plug from treatment bore hole 30 by frictionally engaging with the sides of the bore hole. When the screw plug is turned in the the treatment bore hole 30, the threads engage the walls of the hole and move screw plug 18 and attached container 1 in or out of treatment bore hole 30, depending on the direction screw plug 18 is rotated.

Sealing section 20 includes circular rings, flanges, or fins 148 that wrap around the circumference of screw plug 18 near distal end 37. There can be as few as one or as many as 20 or more circular rings that are generally parallel with each other and spaced apart from each other. The rings seal between screw plug 18 and the wall of treatment bore hole 30. Rings 148 restrict the leak path from the inner part of treatment bore hole 30 to the outside, thus preventing the escape of the chemical composition out of the end of treatment bore hole 30.

Adapter and Installation/Removal Tool

Figure 14:
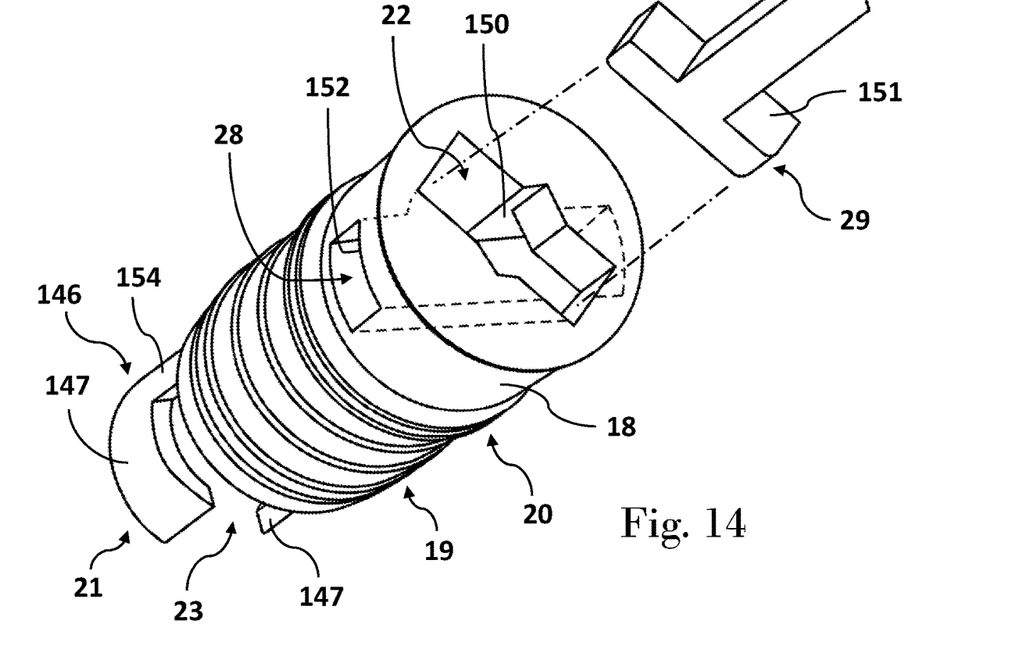
FIG. 14 is an isometric view of the screw plug shown in FIG. 12 with a manipulation tool being inserted in an end opening in the screw plug.

A T-shaped manipulation tool 29, shown in FIGS. 14 and 15, is configured to conform to and positively engage the structure of distal end 37 of screw plug 18 for manipulation of the screw plug and container 1 attached to the screw plug. As is described further below, manipulation tool 29 may be used to install the wood treatment device in or remove the wood treatment device from treatment bore hole 30 of a wood member. The manipulation tool is inserted into a slot 22, also referred to as an opening, extending axially into end 37, and rotated, such as with an impact driver or wrench. Slot 22 is rectangular in this example, and intersects a cross hole 28. Cross hole 28 extends transverse to slot 22 and intersects with the slot. Cross hole 28 is defined in part by a wall 150 against which a foot 151 of tool 29 presses during rotation of the screw plug. Cross hole 28 also is defined by an exposed contact surface 152 facing the container and against which foot 151 presses when tool 29 is used to apply a pulling force to the screw plug and container during removal of the wood treatment device from a bore hole.

The combination of these features allows the application technician to engage screw plug 18 with the T-shaped tool 29 to insert and remove screw plug 18 from treatment bore hole 30. Tool 29 inserts into slot feature 22 and when screw plug 18 is rotated clockwise, it enters cross hole 28 and seats against wall 150 and contact surface 152, essentially locking the screw plug onto the end of tool 29. Screw plug 18 and the rest of the wood treatment device can now be inserted into treatment bore hole 30 without falling off of tool 29. Screw plug 18 is driven into treatment hole 30 by rotating the screw plug clockwise. To remove screw plug 18 from treatment bore hole 30, tool 29 is inserted into slot 22, the tip of tool 29 rotates into cross hole 28, allowing screw plug 18 to remain engaged to tool 29 when the plug is removed from treatment hole 30. This engagement between screw plug 18 and tool 29 allows the applicator to apply a pull force on screw plug 18 while rotating, engaging contact surface 152 with tool 29, and permitting removal. The use of tool 29 in slot 22 and cross hole 28 aid in the removal of container 1 for replacement with a full chemical container 1 at retreatment time and allows intermittent removal for inspection such as during quality assurance inspections. Screw plug 18 cannot be removed with conventional tools, helping to discourage tampering of the device.

In some examples, a wood treatment device is an in-service supplemental treatment device that can contain trichloronitromethane and other chemicals during storage and handling. In some examples, a wood storage device may be configured to control a release rate of the contained chemical within the confines of a hole bored into a wood member for the purpose of preventing or stopping internal deterioration of the wood member and thus prolonging the service life of the wood member.

The rate of chemical release into the wood member may be controlled by varying the porosity size of an engineered designed material secured within a release end of an otherwise impervious container. Release rates can be adjusted to fully empty the charged device within minutes, days, or months, and potentially up to several years. A release rate of one month to one year will be typical, however, other release rates can be established within the device. The controlled release rates allow the workman installing the wood treatment device time to avoid exposure to the chemical, reducing the need to wear personal protective equipment.

To further slow the release rate of the chemical, the device open end can be installed in the upward position, restricting chemical movement from the device to the vapor phase.

If an immediate release of chemical from the treating device is necessary, a defeat mechanism, like quick release plunger cap 15, can be used to make this possible. However, it is advisable to use appropriate personal protective equipment when following an immediate release procedure.

Upon retreatment or at any time, the device can be easily removed with the assistance of a sealing device, like screw plug 18, that is configured to be attached to a compatible end of the wood treatment device.

Examples of Device Application:

Factors that can lead to deciding what release rate to use include the length of time before the next inspection cycle; the length of time a structure has been in service; whether decay or insects are present; whether the members have received a previous treatment; the presence of heavy traffic and increased risk of vehicle/pole collisions; and the type and proximity of the neighboring population. Other considerations are likely to arise as wood structure situations are many.

The manufacturer of the wood treatment device will establish and set the release rate by installing the corresponding release mechanism 3 or component into the wood treatment devices. This will allow the structure owner in coordination with the applicator to decide how to manage wood treatment device applications for the situations they will experience. The wood treatment device options include the controlled release function (open end down) as the default usage, vapor phase treatment (open end up), or utilizing the quick release mechanism. When ready to install the wood treatment device, the recommended screw plug is attached and the crimp cap and the underlying gasket are removed.

Following are examples of applications of wood treatment devices in field situations.

Utility Pole Ground Line Treatment Zone Process

During a typical inspection of a wood utility pole, the procedure is to visually inspect the entire pole and attachments for issues that need to be addressed or repaired. An important next step in the inspection process is to bore three or more holes into the pole depending of the size of the pole. The holes are drilled in a spiral pattern from either ground level, or when excavated, starting near the bottom of the excavation which is 18 inches deep. Hole dimensions are normally ⅞" diameter by 16 inches long drilled at a 45 degree or steeper downward angle carefully avoiding seasoning checks, cracks, knots and defects. The holes are spaced equally around the pole to 2 feet up to 5 feet up the pole. Using these holes, the inspector can evaluate the internal condition of the pole. If the pole is rejected and evaluated as not being suitable for continued service, holes are plugged and the pole is reported to the owner who schedules it for replacement depending on the severity of its condition. Well maintained pole line systems can have reject rates of about 1% or less.

If the pole is determined to still be in serviceable condition, it will be treated by inserting the wood treatment device containing chloropicrin into each bored hole. The chemical will sterilize the pole and keep it sterilized for another 10 years when the next inspection and retreatment cycle occurs. At that time the tool, preferably attached to an impact driver, will be inserted and locked into the slot of the screw plug. The tool with then be rotated counterclockwise, thereby turning the wood treatment device counterclockwise to remove the spent container. The spent container is then replaced by a fully chloropicrin charged container. The applicator will not need to wear a respirator or full face mask with organic vapor cartridges and the public will not be subjected to alarming chloropicrin vapor.

Utility Poles and Bridge Members Above Ground Treatment Process

When inspectors perform above ground level inspections to evaluate the condition of individual wood members, they will also insert the wood treatment devices into serviceable poles, piling, or timbers. Inspections may vary but in general the focus is on locations that can collect water and have pathways that lead water and decay fungi and wood destroying insects to unprotected wood. Patterns of drill holes vary somewhat between inspection contractors. An efficient pattern considers an adequate spacing of holes that result in interconnected zones of chloropicrin vapor movement through wood. Pairs of treatment holes ⅞" diameter that are a minimum of 11 inches long and are spaced 4 to 8 feet apart create these zones for a complete area of protection within each wood member. This varies somewhat with the dimensions of the wood members. When drilling holes for fumigant treatment, the wood treatment device allows the inspector to drill holes starting from the bottom surface and entering the wood member in an upward direction. When ready for treatment with the wood treatment device, the inspector decides if open end up (vapor phase) or open end down (controlled release) is better for each particular situation. The adapter (screw plug) is attached to the bottom end of the container. The tool is attached to the impact drill and the tool is inserted into the slot and cross hole. The wood treatment device is then driven into the bore hole by rotation and inward pressure until end 37 of the screw plug is positioned flush to the wood member outer surface.

The following section describes and summarizes aspects and features of the wood treatment devices, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-Reference section, in any suitable manner. Some of the paragraphs below expressly refer to and further limit other paragraphs, providing without limitation examples of some of the suitable combinations.

A1. A wood treatment device comprising a container having an elongate body with opposite ends, with at least one of the opposite ends being an open end, the container defining an internal expanse for holding a wood-treatment agent in fluid communication with the open end, the container being made of a material that is non-permeable and non-reactive to the wood-treatment agent; and a closure assembly configured, when positioned at the container open end to close at least partially the open end, the closure assembly including a release unit having an inner face exposed to the internal expanse and an outer face facing away from the internal expanse, the release unit being permeable to the wood-treatment agent and configured to impede passage of the wood-treatment agent through the release unit.

A2. The wood treatment device of paragraph A1, wherein the closure assembly further includes a seal sealingly covering the open end, the seal being manually defeatable for establishing a travel path for the treatment agent past the release unit to the exterior of the container.

A3. The wood treatment device of paragraph A2, wherein the closure assembly includes a cap assembly configured to be manually movable onto the open end, the cap assembly including a release tool configured to defeat the seal when the cap assembly is manually moved onto the open end.

A4. The wood treatment device of paragraph A3, wherein the cap assembly secures to the open end when the cap assembly is moved so that the release tool defeats the seal.

A5. The wood treatment device of paragraph A3, wherein the cap assembly includes the release unit.

A6. The wood treatment device of paragraph A5, wherein the release unit is disposed distally of the release tool relative to the container, and the cap assembly defines a treatment-agent passageway between the release tool and the release unit.

A7. The wood treatment device of paragraph A1, wherein the open end defines a passageway between the internal expanse of the body and externally of the container, and the release unit is located in the open-end passageway, the wood treatment device further comprising a cap assembly configured to be manually movable onto the open end of the container, the cap assembly including an extension configured to extend through the open-end passageway sufficiently to move the release unit from the open-end passageway into the internal expanse of the body seal when the cap assembly is manually moved onto the open end of the container.

A8. The wood treatment device of paragraph A7, wherein the cap assembly includes at least one channel allowing unrestricted flow of the treatment agent from the open-end passageway to externally of the wood treatment device when the cap assembly is positioned on the open end.

A9. The wood treatment device of paragraph A7, wherein the cap assembly is configured to be secured to the container when the cap assembly is manually moved onto the open end.

A10. The wood treatment device of paragraph A9, wherein the cap assembly includes a shroud extending around at least a portion of sides of the container along the open end.

A11. The wood treatment device of paragraph A1, further comprising an adapter extending distally of the container, the adapter having an exposed surface facing the container and defining an opening, the opening extending axially from a distal end of the adapter toward the container past the exposed surface and axially between the exposed surface and the container, the opening allowing a foot of an elongate manipulation tool to be moved through the opening and pivoted laterally to a position between the exposed surface and the container.

A12. The wood treatment device of paragraph A11, wherein the adapter further defines a wall extending along the opening axially toward the container adjacent the exposed surface, the wall serving as a stop limiting travel of the foot of the manipulation tool along the exposed surface.

A13. The wood treatment device of paragraph A11, wherein at least one of the opposite ends of the container has a neck section extending from the container body and a lip section adjacent to the neck section and distal of the container body, the neck section being narrower than the lip section, and the adapter is configured to be selectively manually secured to the neck section.

A14. The wood treatment device of paragraph A13, wherein the body, neck, and lip are respectively cylindrical, and the lip has a diameter that is less than a diameter of the body.

A15. The wood treatment device of paragraph A14, wherein the adapter includes a pair of fingers located axially toward the container from the exposed surface and defining a neck space having a size configured to accommodate the neck but not accommodate the lip.

A16. The wood treatment device of paragraph A13, wherein the fingers are resilient and have finger ends that are spaced apart less than a cross-sectional dimension of the neck and sufficiently wide to allow nondestructive deflection of the fingers during passage of the neck between the finger ends.

A17. The wood treatment device of paragraph A1, wherein the container has cross-sectional dimensions, and further comprising an adapter having at least one laterally extending flange and an attachment portion, the flange having greater cross-sectional dimensions than the cross-sectional dimensions of the container, the attachment portion being configured to engage selectively at least one of the opposite ends of the container for securing the adapter to the container.

A18. The wood treatment device of paragraph A17, wherein the adapter has a plurality of the flanges, the flanges being spaced apart axially from each other.

B1. A wood treatment device comprising a container having an elongate body with opposite ends, with at least one of the opposite ends being an open end, the body defining an internal expanse for holding a wood-treatment agent, the container being made of a material that is non-permeable and non-reactive to the wood-treatment agent, the opposite ends each having a neck section extending from the body and a lip section adjacent to the neck section and distal of the body, the neck section being narrower than the lip section; a closure assembly configured, when positioned at the container open end, to retain the wood-treatment agent in the internal expanse; and an adapter extending distally of the container, the adapter having an exposed surface facing the container and defining an opening, the opening extending axially from a distal end of the adapter toward the container past the exposed surface and radially between the exposed surface and the container, the opening allowing a foot of an elongate manipulation tool to be moved through the opening and pivoted laterally to a position between the exposed surface and the container.

B2. The wood treatment device of paragraph B1, wherein the adapter further defines a wall extending axially toward the container adjacent the exposed surface, the wall serving as a stop limiting travel of the foot of the manipulation tool along the exposed surface.

B3. The wood treatment device of paragraph B1, wherein the adapter is configured to be selectively manually secured to the neck section.

B4. The wood treatment device of paragraph B3, wherein the body, neck, and lip are respectively cylindrical, and the lip has a diameter that is less than a diameter of the body.

B5. The wood treatment device of paragraph B4, wherein the adapter includes a pair of fingers located axially toward the container from the exposed surface and defining a neck space having a size accommodating the neck but not accommodating the lip.

B6. The wood treatment device of paragraph B5, wherein the fingers are resilient and have finger ends that are spaced apart less than a cross-sectional dimension of the neck and sufficiently wide to allow nondestructive deflection of the fingers during passage of the neck between the finger ends.

B7. The wood treatment device of paragraph B1, wherein the container has cross-sectional dimensions, and the adapter further includes at least one laterally extending flange and an attachment portion, the flange having greater cross-sectional dimensions than the cross-sectional dimensions of the container, the attachment portion being configured to engage selectively at least one of the opposite ends of the container for securing the adapter to the container.

B8. The wood treatment device of paragraph B7, wherein the adapter has a plurality of the flanges, the flanges being spaced apart axially from each other.

The different embodiments of the wood treatment device described herein provide several advantages over known solutions for handling and applying wood treatment chemicals. For example, the illustrative embodiments of the wood treatment device described herein allow installation of the wood treatment device and release of the wood treatment chemical without the need for protective gear. Additionally, and among other benefits, illustrative embodiments of the wood treatment device described herein allow installation and removal of the device using a bore-sealing adapter. No known system or device can perform these functions, particularly when applying Trichloronitromethane. Thus, the illustrative embodiments described herein are particularly useful for extending the effectiveness of wood preservative protocols. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A wood treatment device comprising:
a supply of trichloronitromethane;
a container having an elongate body with a closed end and an opposite open end, the container defining an internal expanse holding the supply of trichloronitromethane, and an open-end section interposed between the internal expanse and the open end, the open-end section defining an open-end passageway providing the only fluid communication through the container between the internal expanse and the open end, the open end passageway having a reduced cross-sectional area compared to the internal expanse, and the container being made of a material that is non-permeable and non-reactive to the supply of trichloronitromethane; and a plug disposed in the open-end section of the container, filling the open-end passageway, made of a porous material, and having a porous inner face and a porous outer face, wherein the inner face extends across the open-end passageway and is exposed across the inner face to the internal expanse, the outer face faces away from the internal expanse, and the plug is permeable to the supply of trichloronitromethane and is configured to impede passage of the supply of trichloronitromethane through the plug; and a cap assembly configured to be manually positioned on the open end of the container, the cap assembly including an extension having a blunt end configured to extend through the open-end passageway sufficiently to dislodge the plug from the open-end section and move the plug from the open-end passageway in the open-end section into the internal expanse of the body when the cap assembly is manually positioned on the open end of the container, wherein the extension includes an extension rib extending laterally outwardly along a length of the extension with the extension rib forming a side of an extension channel along the extension, and the cap assembly includes at least one channel allowing less restricted flow of the supply of trichloronitromethane from the open-end passageway to externally of the wood treatment device when the cap assembly is positioned on the open end compared to flow through the plug, and the cap assembly includes a shroud extending around at least a portion of sides of the container along the exterior of the open end when the cap assembly is positioned on the open end of the container and the at least one channel extends between the shroud and the open-end section of the container when the cap assembly is positioned on the open end of the container, the shroud including a shroud rib extending laterally inwardly along a length of the shroud with the shroud rib also forming a side of the one channel along the shroud.

2. A wood treatment device comprising:

a supply of trichloronitromethane;

a container having an elongate body with a closed end and an opposite open end, the container defining an internal expanse holding the supply of trichloronitromethane, and an open-end section interposed between the internal expanse and the open end, the open-end section defining an open-end passageway providing the only fluid communication through the container between the internal expanse and the open end, the container being made of a material that is non-permeable and non-reactive to the supply of trichloronitromethane;

a plug disposed in the open-end section of the container, filling the open-end passageway, made of a porous material, and having a porous inner face and a porous outer face, wherein the inner face extends across the open-end passageway and is exposed across the inner face to the internal expanse, the outer face faces away from the internal expanse, and the plug is permeable to the supply of trichloronitromethane and is configured to impede passage of the supply of trichloronitromethane through the plug; and an adapter extending distally of the container, the adapter having a proximal end configured to be selectively manually secured to one of the ends of the container, and a distal end positioned distally of the container, the distal end having a slot and a cross hole, wherein the slot is open from a distal surface of the adapter and extends into the distal end toward the container, and the cross hole extends laterally from the slot in a position spaced toward the container from the distal surface, the cross hole being defined in part by a contact surface extending laterally from the slot and a wall extending along the cross hole axially toward the container from the contact surface, the wall serving as a stop limiting travel of a foot of an elongate manipulation tool inserted through the slot axially toward the container and pivoted laterally to a position in the cross hole between the contact surface and the container;

wherein the one end of the container has a neck section extending from the body and a lip section adjacent to the neck section and distal of the body, the neck section being narrower than the lip section; the body, neck section, and lip section are respectively cylindrical, and the lip section has a diameter that is less than a diameter of the body; and the adapter includes an attachment component having at least a first finger located axially toward the container from the contact surface and defining a neck space having a size configured to accommodate the neck section but not accommodate the lip section.

3. The wood treatment device of claim 2 wherein the at least a first finger is resilient and the attachment component defines a gap defined at least in part by an end the at least a first finger that is less than a cross-sectional dimension of the neck section and sufficiently wide to allow nondestructive deflection of the at least a first finger during passage of the neck section through the gap.

* * * * *